(12) United States Patent
Fang et al.

(10) Patent No.: US 12,513,240 B2
(45) Date of Patent: Dec. 30, 2025

(54) DETECTING MODEM POWER STATE CHANGE

(71) Applicant: BRITISH TELECOMMUNICATIONS PUBLIC LIMITED COMPANY, London (GB)

(72) Inventors: Feiyu Fang, London (GB); Lykourgos Kekempanos, London (GB); Daniel Gilks, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 245 days.

(21) Appl. No.: 18/567,585

(22) PCT Filed: Jun. 10, 2022

(86) PCT No.: PCT/EP2022/065884
§ 371 (c)(1),
(2) Date: Dec. 6, 2023

(87) PCT Pub. No.: WO2022/268534
PCT Pub. Date: Dec. 29, 2022

(65) Prior Publication Data
US 2024/0267456 A1 Aug. 8, 2024

(30) Foreign Application Priority Data
Jun. 22, 2021 (GB) ...................................... 2108947

(51) Int. Cl.
*H04M 3/30* (2006.01)
*H04B 3/493* (2015.01)

(52) U.S. Cl.
CPC ............ *H04M 3/306* (2013.01); *H04B 3/493* (2015.01); *H04M 3/304* (2013.01)

(58) Field of Classification Search
CPC ........ H04M 3/304; H04M 3/306; H04B 3/493
USPC ....................................................... 379/1.04
See application file for complete search history.

(56) References Cited

U.S. PATENT DOCUMENTS

| | | | |
|---|---|---|---|
| 6,754,186 B1 | 6/2004 | Bullman | |
| 7,068,755 B2 * | 6/2006 | Qiu | H04M 11/062 379/1.04 |
| 7,127,049 B2 | 10/2006 | Godse et al. | |

(Continued)

FOREIGN PATENT DOCUMENTS

WO    2008042882 A2    4/2008

OTHER PUBLICATIONS

International Search Report for PCT/KR2022/019552, mailed Mar. 9, 2023, 4 pages.

(Continued)

*Primary Examiner* — Binh Kien Tieu
(74) *Attorney, Agent, or Firm* — Nixon & Vanderhye P.C.

(57) ABSTRACT

A method of determining when there has been a change in the modem power state of a modem connected to a digital subscriber line. An Uncalibrated Echo Response (UER) trace is obtained from the digital subscriber line by running a Single Ended Line Test (SELT) on the line. This UER trace is compared to a historical (baseline) UER trace from the same line. A difference in the two traces in a higher frequency range (for example, DS3 for a VDSL line), is indicative of a possible modem power state change.

8 Claims, 6 Drawing Sheets

(56) References Cited

U.S. PATENT DOCUMENTS

| | | | |
|---|---|---|---|
| 7,212,496 B1 * | 5/2007 | Chong | H04L 1/243 |
| | | | 379/27.04 |
| 7,334,252 B1 * | 2/2008 | Millet | H04L 12/2872 |
| | | | 725/111 |
| 9,312,916 B2 | 4/2016 | Dardenne et al. | |
| 10,051,117 B2 | 8/2018 | Zahedi et al. | |
| 12,261,978 B1 * | 3/2025 | Fang | H04M 3/085 |
| 2003/0147506 A1 * | 8/2003 | Kamali | H04M 3/085 |
| | | | 379/1.04 |
| 2005/0025227 A1 | 2/2005 | Noma et al. | |
| 2006/0251160 A1 | 11/2006 | Fazlollahi et al. | |
| 2008/0089485 A1 * | 4/2008 | Duvaut | H04M 3/306 |
| | | | 379/1.03 |
| 2014/0126705 A1 | 5/2014 | Levonas | |
| 2018/0027113 A1 | 1/2018 | Mohseni | |
| 2024/0414649 A1 * | 12/2024 | Maamari | H04W 52/0229 |
| 2025/0106768 A1 * | 3/2025 | Barth | H04W 52/0248 |
| 2025/0231902 A1 * | 7/2025 | Hsieh | G06F 13/4282 |

OTHER PUBLICATIONS

Combined Search Report and Examination Report for GB2108947. 9, dated Sep. 28, 2021, 6 pages.
Advanced xDSL Line Testing and Fault Location for Service Providers, ASSIA, (c) 2015, 13 pages.
International Preliminary Report on Patentability dated Jan. 4, 2024, issued for International Application No. PCT/EP2022/065884 (8 pages).
Patents Act 1977: Intention to Grant under Section 18(4) dated Jun. 24, 2024, issued for GB Application No. GB2108947.9 (2 pages).
Communication pursuant to Article 94(3) EPC dated Jul. 29, 2025 issued for European Application No. 22 735 805.8 (4 pages).

* cited by examiner

DETECTING MODEM POWER STATE CHANGE

This application is the U.S. national phase of International Application No. PCT/EP2022/065884 filed Jun. 10, 2022, which designated the U.S. and claims priority to GB Patent Application No. 2108947.9 filed Jun. 22, 2021, the entire contents of each of which are hereby incorporated by reference.

FIELD OF THE INVENTION

This invention relates to a method of identifying when a modem has changed its power state.

BACKGROUND TO THE INVENTION

Digital subscriber line (DSL) technology, often referred to as "broadband", is a family of services that provides digital data transmission over the metallic twisted copper pairs that form part of a local telephone network. DSL is commonly used to provide a customer's home with a network connection, typically to the Internet via an ISP.

However, DSL lines may develop to faults, arising for example from faulty joints or interference. Various approaches have been used to identify and locate faults. For example, if a DSL line is synchronised and able to provide some level of service, then various DSL line parameters (e.g. SNR margin, line attenuation, bit error rates) can be measured and analysed to identify certain of fault. These in-sync measurements are typically made at the DSLAM (digital subscriber line access multiplexer). Diagnostic exchange tests can also be done by specialist line test equipment located at the central office, and include copper line tests in the electrical domain. These include measurements such as capacitances and resistances, which can also be analysed to help identify faults.

However, in very high speed DSL (VDSL) services, often referred to as "Fibre to the Cabinet", specialist line test equipment is generally not available, as the DSLAM for VDSL services is typically not located in an exchange, but instead in a primary connection point (PCP) such as a roadside cabinet, which may not have the physical capacity for such equipment, or such equipment may be prohibitively costly to install in the cabinet.

Furthermore, many of the measurements made by the DSLAM that are currently used to identify faults rely on a DSL line being initialised and synchronised. Therefore, certain faults such a physically disconnected line make it impossible for a line to initialize and synchronise, thus making such measurements impossible.

Single Ended Line Tests, SELTs, as set out in ITU-T G.996.2, can be used to identify VDSL line conditions without the need for connectivity to the exchange or line sync, as they are based on a single sided test signal launched directly from the DSLAM line driver. SELT techniques typically use frequency domain UER (uncalibrated echo response) traces obtained from a frequency sweep over the VDSL spectrum, which reflects from the end of the line and results in a per-tone interference pattern detected at the DSLAM modem.

SELT UER are highly sensitive to changes in the electrical state of the line, and so can be analysed to identify anomalous behaviour, and thus detect potential faults on a line. This can be done by performing comparisons between historical traces and a current trace to determine whether there may be a fault on the line.

However, a SELT UER trace can also change due to secondary conditions on the line even when the physical line is unchanged, such as terminating equipment impedance changes, wide variations in temperature, and changes in in-line componentry. As such, some lines might be incorrectly identified as faulty, but simply a secondary state change may have occurred. It would be beneficial to identify such conditions to avoid false positives in fault detection.

US patent application US2006/0251160 describes the use a single ended line testing (SELT) method using a Frequency-Domain Reflectometry (FDR) that uses one or more echo signals originated by transmitting a periodic multi-tone signal and analyzes it in frequency domain. The method is able to recognize, from one end of a twisted-pair DSL line, if the other end of the line is open, short, or terminated and can estimate the length of the open or short point from the originating end of the line.

US patent U.S. Pat. No. 9,312,916B2 describes a methods detect whether a splitter of the CPE is correctly connected or reversed. The method compares a value that depends on an attenuation of the telecommunication line with at least one threshold. In case that information about the length of the telecommunication line is available, then a threshold that depends on the loop length may be calculated and compared with the value depending on the attenuation. Otherwise, fixed thresholds may be calculated. When using fixed thresholds, two thresholds may be used in order to identify cases where a reliable determination on whether or not the splitter is connected correctly is not possible.

SUMMARY OF THE INVENTION

According to one aspect of the present invention, there is provided a method detecting a modem power state change, wherein the modem is connected to a digital subscriber line, said method comprising:
- generating a test echo response from the digital subscriber line using a single ended line test, wherein said test echo response comprises a frequency domain trace;
- retrieving a historical echo response associated with the digital subscriber line, wherein the historical echo response comprises a frequency domain trace from the digital subscriber line taken previously;
- calculating the difference between the test echo response and the historical echo response over a higher frequency band; and
- determining if a modem power state change has occurred in dependence on the result of the calculated difference.

Calculating the difference may comprise taking a logarithm of both the test echo response and the historical echo response before calculating the difference; and then determining that a modem power state change has occurred if the difference is constant over the higher frequency band.

The difference between the test echo response and the historical echo response over a higher frequency band may be non-zero.

The single ended line test may be performed by a digital subscriber line access module connected to the digital subscriber line. The digital subscriber line may be a VDSL line, and the higher frequency band may comprise the DS3 band, or a portion of the DS3 band.

The historical echo response may represent an echo response obtained when no faults have been reported on the associated digital subscriber.

The higher frequency band may be dependent on loop length of the digital subscriber line.

According to a further aspect of the present invention, there is provided a test module for of detecting a modem power state change, wherein the modem is connected to a digital subscriber line, and said test module is adapted in operation to:

generate a test echo response from the digital subscriber line using a single ended line test, wherein said test echo response comprises a frequency domain trace;

retrieve a historical echo response associated with the digital subscriber line, wherein the historical echo response comprises a frequency domain trace from the digital subscriber line taken previously;

calculate the difference between the test echo response and the historical echo response over a higher frequency band; and determine if a modem power state change has occurred in dependence on the result of the calculated difference.

Examples of the invention are able to detect changes in the power state of a modem on an out-of-sync VDSL service using UER results from SELT testing. The techniques use frequency domain UER traces obtained from a frequency sweep over the VDSL spectrum, which reflects from the end of the line and results in a per-tone interference pattern detected at the DSLAM modem.

Modem power state changes can cause a significant change in UER traces, and thus it is advantageous to identify these cases so as to avoid incorrectly diagnosing them as physical cable faults. For example, where a fault has been raised with the network provider, but this method identifies that the only change is in modem power state at the customer end, no further action may be needed other than a customer discussion to power the modem back on. This avoids unnecessary engineer visits for potentially erroneously diagnosed faults.

A UER trace can change when a modem at the customer end is switched on or off, though the UER traces in each power state are self-consistent. A modem power state change can thus be detected using a UER baselining process where historical traces are compared to current ones. This is useful for identifying where a UER trace has significantly changed due to a power state change, but the underlying cable is fundamentally unchanged.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

Examples of the present invention present a method of determining when there has been a change in the modem power state of a modem connected to a digital subscriber line. An Uncalibrated Echo Response (UER) trace is obtained from the digital subscriber line by running a Single Ended Line Test (SELT) on the line. The UER is a frequency domain response obtained from a frequency sweep over the VDSL spectrum, which reflects from the end of the line, and results in a per-tone interference pattern detected at the DSLAM modem. This UER trace is compared to a historical (baseline) UER trace from the same line. A difference in the two traces in a higher frequency range (for example, DS3 for a VDSL line), is indicative of a possible modem power state change. In particular, if logarithms of the UER traces are taken before comparison, then a resulting constant difference in a higher frequency range provides a good indication that a modem power state change has occurred.

Figure 1:
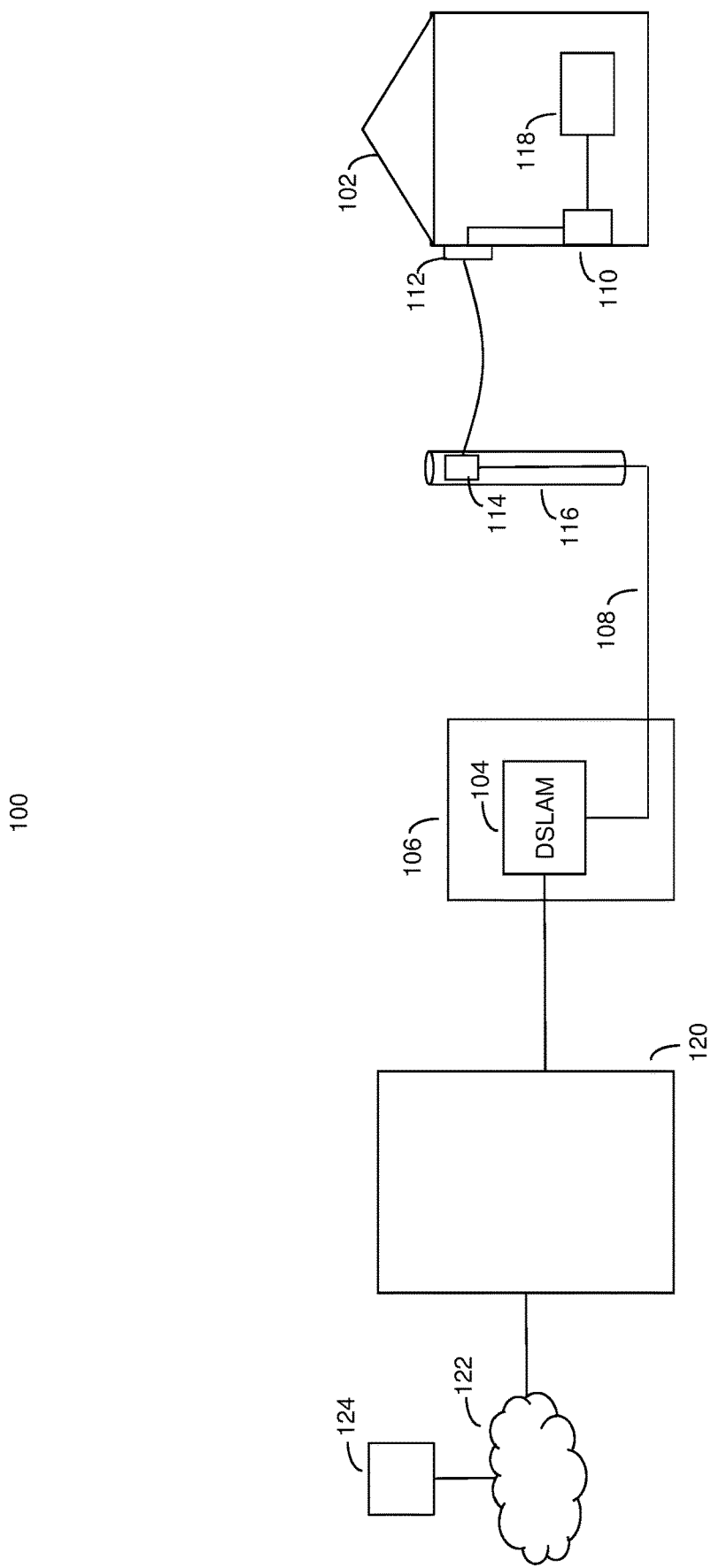
FIG. 1 is a system diagram showing a digital subscriber line running to a customer premises.

FIG. 1 is a simplified system diagram illustrating a telecommunications network 100 including a customer's premises 102. The customer's premises 102 is connected to a DSLAM 104 located at a primary connection point PCP 106, which is typically a roadside cabinet. The connection between the customer premises 102 and DSLAM 104 is provided by a telephone line 108, made of a pair of twisted copper or aluminium wires. Specifically, a network termination equipment NTE 110 is at the customer premises 102 end of the line 108. The NTE 110 is often referred to as a line box or master socket, and is the demarcation point between the telephone network and the customer wiring in the customer premises 102. The line 108 runs from the NTE 110 to a junction box 112, and then onto a distribution point DP 114. In this example, the DP 114 is located on a telephone pole 116. The line 106 then continues onto the PCP 106 and specifically the DSLAM 104. Within the customer premises 102, the NTE 110 is connected to customer premises equipment CPE 118, which is typically a router or home hub that includes a modem.

A DSLAM is a network element that provides digital subscriber line (DSL) services to connected lines and associated customer premises. The line 108 is thus also referred to as digital subscriber line, or DSL line. In this example, the DSLAM 104 provides a VDSL service on the line 108. The DSLAM 104 also has an onward connection, typically a fibre optic connection, to the local exchange 120, and from there onto data provisioning networks 122 via suitable connections and equipment. The data provisioning networks may include the internet and other networks. A skilled person will appreciate that there are other elements in the network 100 that have been omitted for simplicity, such as elements that provide standard PSTN services to the line 108.

Also shown connected to the data provisioning network is a test module or test server 124. The test module 124 comprises a processor and a data store, such as hard disk array or similar. The test module 124 gathers data from the DSLAM 104, and the processor can use that data, together with other data, to determine if there is a disconnect on the line.

Whilst the present example shows a DSLAM residing in a PCP (roadside cabinet), the invention would still be applicable to configurations where the DSLAM is situated somewhere else. For example, the invention could still be applied to networks and services where the DSLAM is located in the local exchange 120.

Furthermore, FIG. 1 only shows a single line and associated elements. However, in practice there will be a number of lines, each serving a respective customer premises, connected to the DSLAM. Moreover, there will be many DSLAMs connected to the exchange, and nationally there will be many exchanges. Any number of these lines can be tested by the test server 124 using the methods described below.

Figure 2:
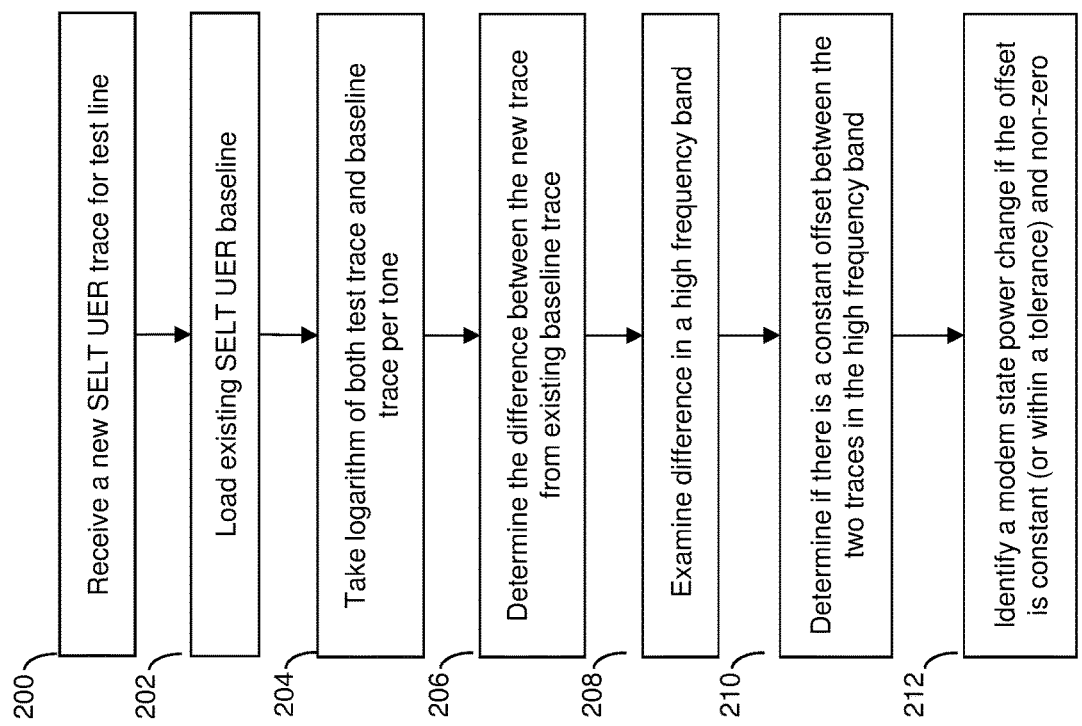
FIG. 2 is a flow chart summarising the steps of an example of the invention.

FIG. 2 is a flow chart summarising the steps of the present invention as performed by the test module 124.

In step 200, the test module 124 receives a SELT UER response (or test trace) for the test line 108. The SELT UER response is obtained from the DSLAM 104 by performing SELT measurements using a frequency sweep over the VDSL spectrum on the line. A more detailed discussion of the SELT standard can be found in the International Telecommunication Union recommendation G.996.2, "Single-ended line testing for digital subscriber lines". SELT measurements consist of sending wideband signals down a line, with the UER being the received signals reflected back from the line (over a frequency range).

SELTs can be run remotely and can run regardless of the line synchronisation condition, and when the line is faulty or undergoing repairs. In contrast, service layer tests require a line to be synchronised.

Figure 3:
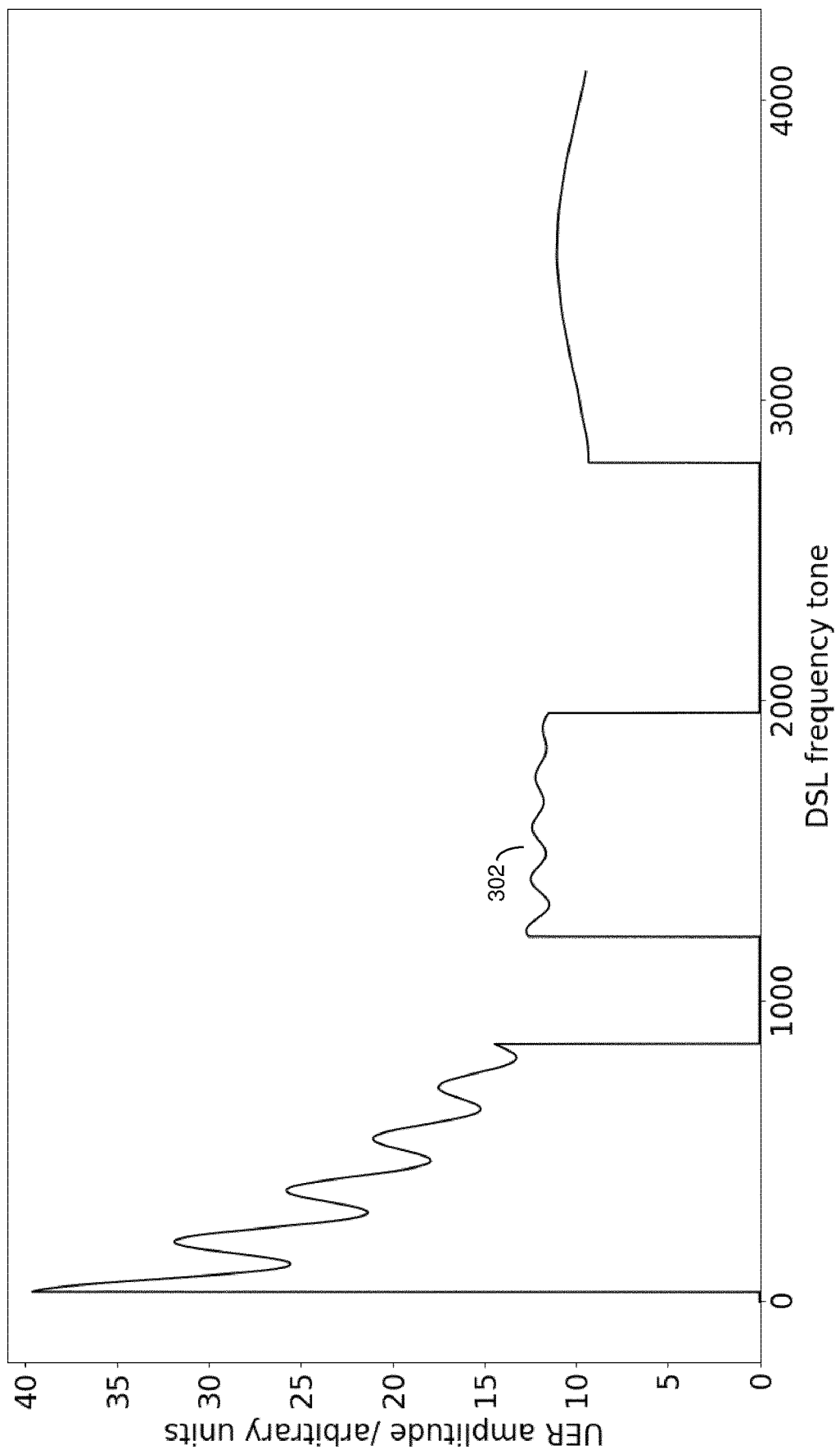
FIG. 3 is an example of a SELT UER trace representative of a line with a powered-off modem.

The SELT UER comprises an array of complex values representing the phase and amplitude of the reflected waves detected over the frequency range. This is encoded as two arrays, Real and Imaginary components and a data scaling factor. An example of a SELT UER trace illustrated in a graph of detected amplitude plotted against frequency as shown in FIG. 3. The plot 302 in FIG. 3 represents a trace from a line with a powered-off modem.

In step 202, the test module 124 loads a baseline or historical SELT UER response associated with the line. The baseline SELT UER response is representative of what the response on the line should look like when in good working condition. One way in which to initially generate this baseline SELT UER response is by performing a number of SELTs over a period of time on the line. If these responses are fundamentally similar (i.e. largely the same shape), then it is assumed the line is in a stable good line condition, and a baseline response is generated from the responses—for example some average or weighted average of the responses. Note, if the responses differ significantly from each other, then no baseline is generated, and instead a potential fault might be diagnosed instead.

Figure 4:
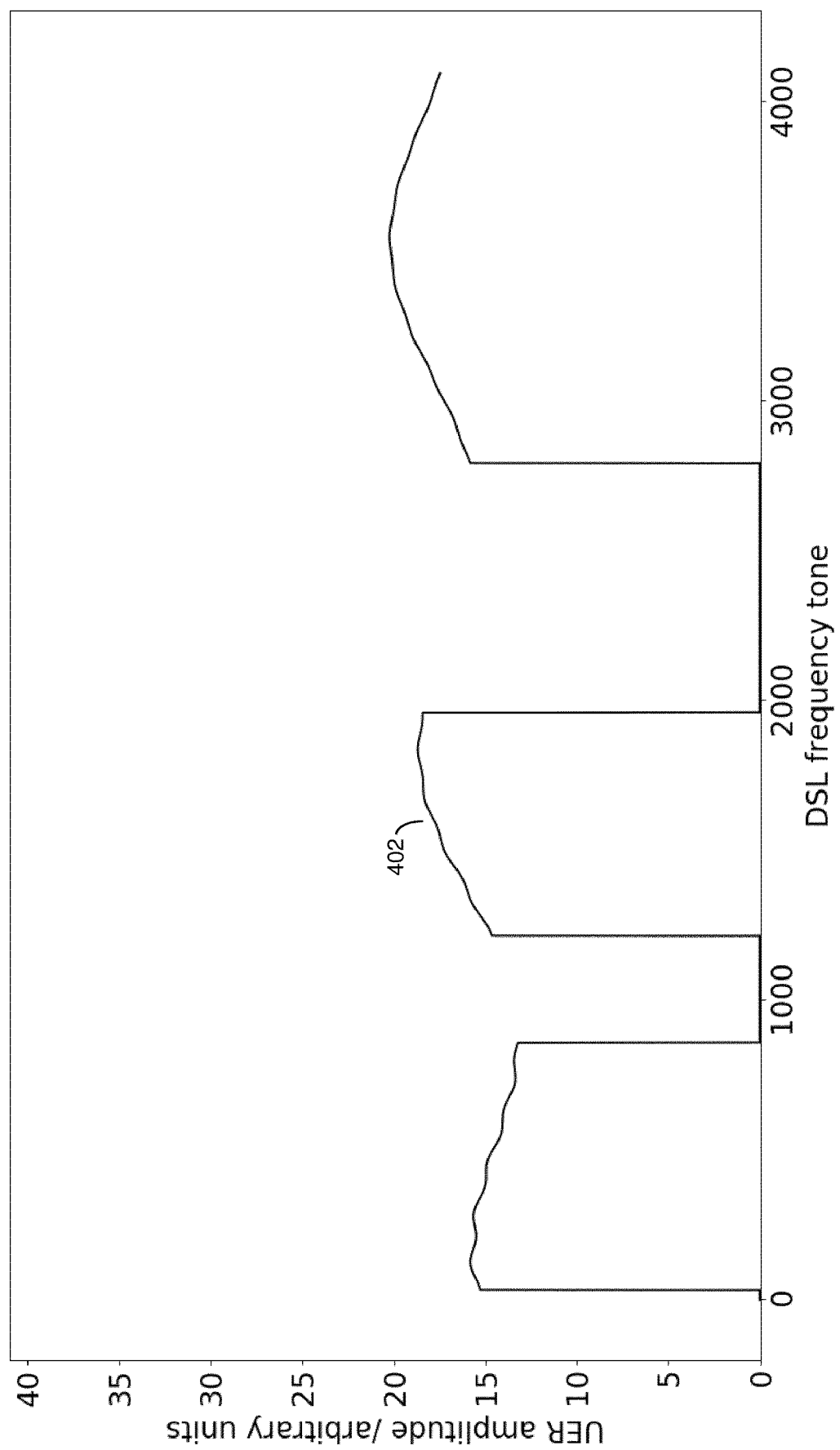
FIG. 4 is an example of a SELT UER trace representative of a line with a powered-on modem.

An example of a baseline SELT UER trace illustrated as a plot of detected amplitude versus against frequency is shown in FIG. 4. The plot 402 in FIG. 4 represents a trace from a line with a powered-on modem.

It can be seen from the traces of FIG. 3 and FIG. 4 that there are differences associated with powered-off versus powered-on modems respectively. Thus, it is possible to compare the test trace 302 from step 200 with the baseline trace 402 from step 202 to see if such differences exist, and determine whether there has been a modem state power change from any difference. However, better results can be achieved by performing the additional steps now described.

Figure 5:
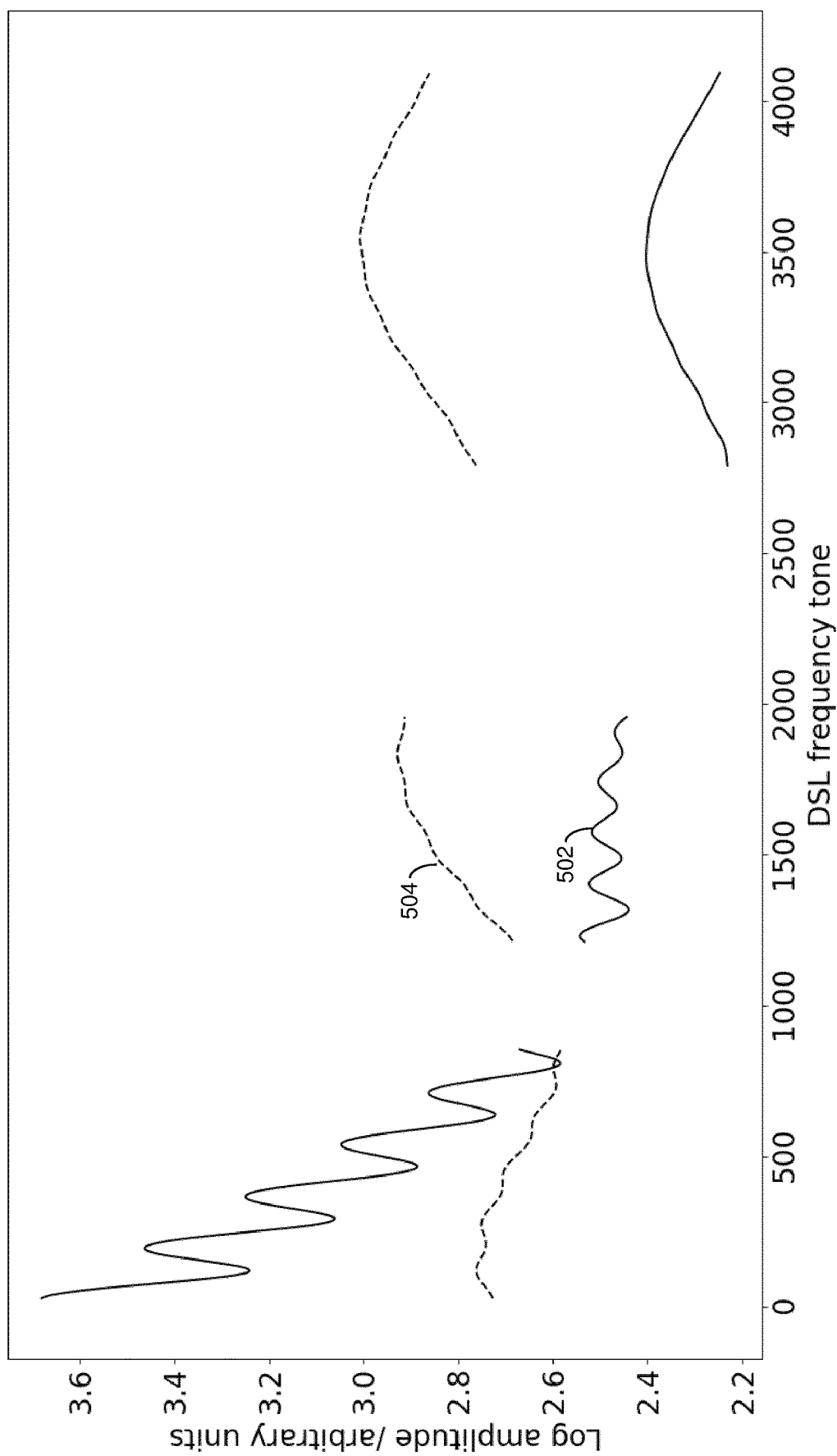
FIG. 5 shows the log of an example test trace and log of an example baseline trace.

In step 204, the test trace and baseline trace are converted into logarithmic amplitude by taking the logarithm of each tone across the spectrum for each trace. Alternative mathematical operations may also work for this, however, the logarithm has been found to give the clearest characteristic shape in a subtraction step later. FIG. 5 shows the log of the test trace 502 (solid plot) and baseline trace 504 (dashed plot) on a single graph.

Figure 6:
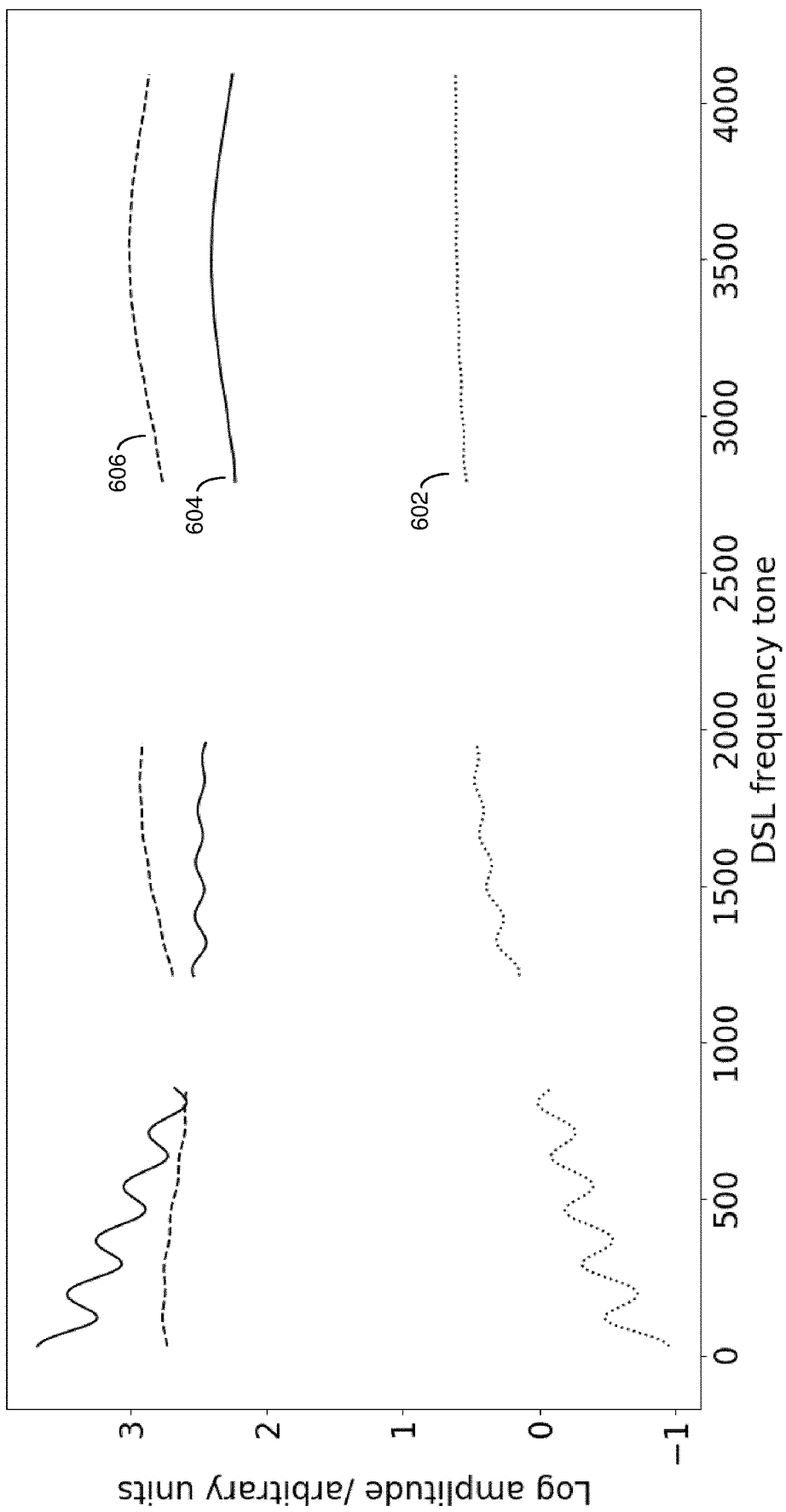
FIG. 6 shows a plot resulting from the subtraction of the log test trace and log baseline trace.

In step 206, the difference between the test trace and baseline trace is calculated. This can be done by subtracting the two logarithmic amplitude traces from each other per VDSL tone across the spectrum. FIG. 6 shows a plot 602 (dotted plot) of the result of the subtraction of the logarithmic amplitude test trace 604 (solid plot) and baseline trace 606 (dashed plot).

In step 208, the difference in a high frequency band is examined. In this example, where the line 108 is a VDSL line, the high frequency band has been chosen as that of DS3 as described in ITU-T G.993.2. DS3 is the highest frequency band that is used for data transmissions (in the downstream direction), and occupies tones 2793 to 4096 in the bandplan. Other frequency bands could be used, such as a narrower range within DS3 for VDSL lines. Indeed, a higher frequency band narrower in range than DS3 is sometimes preferable as dependent on modem configuration, the entire DS3 frequency range is not always used.

In step 210, the difference in this higher frequency band is examined to determine if the difference is constant or substantially constant within a tolerance. This can be done a number of ways.

One way is by taking the average value from each tone over the high-frequency band from the subtracted resultant trace. Then a tolerance, for example 10% of the average, can be set either side of this average value. Then a count can be made of the number of tones in the high frequency band of the subtracted trace that fall within the tolerance.

Then in step 212, if the number of tones that fall within the tolerance from step 210 is above a given threshold, then modem power state change has been positively identified, as the subtracted trace is approximately flat in the high frequency band tested. Otherwise, the two traces are significantly different due to a cause other than a modem power state change.

Note, the difference from step 210 must also be non-zero, as comparing identical test and baseline traces would yield a constant, albeit zero, difference.

To understand how this approach works, we need to look at what the SELT UER traces represent. With SELT UER traces, harmonic features in the lower frequencies indicate a reflection from the end of the line, decreasing in amplitude with increasing frequency. These features are subdued on lines with a powered-on modem due to absorption of the signal by the modem, but are still present.

Where a modem on a tested line has changed from powered-on to powered-off, or vice versa, these harmonic features oscillate with the same harmonic frequency in the low frequencies as the line length is unchanged, but the rest of the trace behaves differently between the two cases due to the modem absorption. However, with increasing frequency, the harmonic features increasingly oscillate around a central value that follows the same overall shape on a logarithmic scale in both cases. This is as shown in FIG. 5, where the harmonic features oscillate with the same pattern in both traces, but more strongly in the powered-off trace 502 until it eventually oscillates around the same overall trace shape.

A constant offset between the new trace and the original baseline in logarithmic amplitude in the higher frequency bands indicates absorption from the modem. This may be detected by subtracting the two logarithmic amplitude traces per tone and checking if the resultant trace is flat but non-zero at higher frequencies, such as in the DS3 band.

Note, that a constant offset in the logarithmic space (in the higher frequency band) is equivalent to a constant multiplicative factor in the original linear space: from $\log(x) - \log(y) = \log(x/y)$. Therefore, one alternative approach to detecting a modem power state change is to look for a multiplicative factor between the test and baseline traces in a higher frequency band.

Exemplary embodiments of the invention are realised, at least in part, by executable computer program code which may be embodied in an application program data. When such computer program code is loaded into the memory of the processor in the test module 124, it provides a computer program code structure which is capable of performing at least part of the methods in accordance with the above described exemplary embodiments of the invention.

A person skilled in the art will appreciate that the computer program structure referred to can correspond to the flow chart shown in FIG. 2, where each step of the flow chart can correspond to at least one line of computer program code and that such, in combination with the processor in the test module 124, provides apparatus for effecting the described process.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of detecting a modem power state change, wherein the modem is connected to a digital subscriber line, said method comprising:
   generating a test echo response from the digital subscriber line using a single ended line test, wherein said test echo response comprises a frequency domain trace;
   retrieving a historical echo response associated with the digital subscriber line, wherein the historical echo response comprises a frequency domain trace from the digital subscriber line taken previously;
   calculating the difference between the test echo response and the historical echo response over a higher frequency band; and
   determining if a modem power state change has occurred in dependence on the result of the calculated difference.

2. A method according to claim 1, wherein
   calculating the difference comprises taking a logarithm of both the test echo response and the historical echo response before calculating the difference; and
   determining that a modem power state change has occurred if the difference is constant over the higher frequency band.

3. A method according to claim 2, wherein the difference is non-zero.

4. A method according to claim 1, wherein the single ended line test is performed by a digital subscriber line access module connected to the digital subscriber line.

5. A method according to claim 1, wherein the digital subscriber line is a VDSL line, and the higher frequency band comprises the DS3 band.

6. A method according to claim 1, wherein the historical echo response represents an echo response obtained when no faults have been reported on the associated digital subscriber.

7. A method according to claim 1, wherein the higher frequency band is dependent on loop length of the digital subscriber line.

8. A test module for of detecting a modem power state change, wherein the modem is connected to a digital subscriber line, and said test module is adapted in operation to:
   generate a test echo response from the digital subscriber line using a single ended line test, wherein said test echo response comprises a frequency domain trace;
   retrieve a historical echo response associated with the digital subscriber line, wherein the historical echo response comprises a frequency domain trace from the digital subscriber line taken previously;
   calculate the difference between the test echo response and the historical echo response over a higher frequency band; and
determine if a modem power state change has occurred in dependence on the result of the calculated difference.

* * * * *